United States Patent [19]

Kobayashi et al.

[11] Patent Number: 4,670,510

[45] Date of Patent: Jun. 2, 1987

[54] POLYESTER TYPE BLOCK COPOLYMER COMPOSITION

[75] Inventors: Takuma Kobayashi; Hironobu Kitagawa; Shigeo Kobayashi, all of Otsu, Japan

[73] Assignee: Toyo Boseki Kabushiki Kaisha, Osaka, Japan

[21] Appl. No.: 761,276

[22] Filed: Aug. 1, 1985

Related U.S. Application Data

[63] Continuation of Ser. No. 492,918, May 9, 1983, abandoned.

[30] Foreign Application Priority Data

Feb. 18, 1983 [JP] Japan .................................. 58-26677
Feb. 22, 1983 [JP] Japan .................................. 58-29064

[51] Int. Cl.$^4$ .................... C08L 67/02; C08L 67/04
[52] U.S. Cl. ........................................ 525/89; 525/64; 525/92; 525/174
[58] Field of Search ............. 525/92, 176, 174, 89, 525/64

[56] References Cited

U.S. PATENT DOCUMENTS

| | | | |
|---|---|---|---|
| 3,435,093 | 3/1969 | Cope | 525/176 |
| 3,639,527 | 2/1972 | Brinkman | 525/176 |
| 3,651,014 | 2/1972 | Witsiepe | 528/201 |
| 3,761,450 | 9/1973 | Herwig et al. | 525/437 |
| 4,010,222 | 3/1977 | Shih | 525/176 |
| 4,031,165 | 6/1977 | Saiki | 525/411 |
| 4,322,335 | 3/1982 | Nield | 525/176 |
| 4,344,874 | 8/1982 | Akagi | 524/400 |
| 4,401,792 | 8/1983 | Axelrod | 525/175 |

FOREIGN PATENT DOCUMENTS

| | | |
|---|---|---|
| 0055687 | 7/1982 | European Pat. Off. . |
| 2014770 | 10/1970 | Fed. Rep. of Germany . |
| 1945967 | 3/1971 | Fed. Rep. of Germany . |
| 1578694 | 8/1969 | France . |
| 48-004116 | 6/1973 | Japan . |

OTHER PUBLICATIONS

WPI World Patent Index, Gazette Index Japanese Patents, 40th week, 1973, Accession No. 73-58847U[40], JP 77-49037, (Abstract only).

WPI World Patent Index, Gazette Index Japanese Patents, 6th week, 1973, Accession No. 73-08009U[06], JP 73-4116.

WPI, World Patent Index, Gazette Index Japanese Patents, 6th week, 1973, Accession No. 73-08808U[06], JP 73-4115 (Abstract only).

*Primary Examiner*—John C. Bleutge
*Assistant Examiner*—Patricia A. Short

[57] ABSTRACT

An improved polyester type block copolymer composition having a rubber-like elasticity, particularly having excellent moldability, which comprises a polyester type block copolymer produced from a crystalline aromatic polyester and a lactone in melt-admixture with a carboxylic acid compound selected from an ethylene-carboxylic acid copolymer and an aliphatic carboxylic acid metal salt.

4 Claims, No Drawings

POLYESTER TYPE BLOCK COPOLYMER COMPOSITION

This is a continuation of application Ser. No. 492,918, filed May 9, 1983, now abandoned.

The present invention relates to an improved polyester block copolymer composition having a rubber-like elasticity, more particularly, to an improvement in moldability of a polyester type block copolymer produced by reacting an aromatic polyester and a lactone.

It is well known to produce polymers by reacting an aromatic polyester and a lactone, for example, by reacting a crystalline aromatic polyester and a lactone (cf. Japanese Patent Publication No. 4116/1973); by reacting a crystalline aromatic polyester and a lactone, followed by reacting the resulting block prepolymer with a polyfunctional acylating agent to extend the chain of the polymer (cf. Japanese Patent Publication No. 4115/1973); or by polymerizing a lactone in the presence of a crystalline aromatic polyester in solid state (cf. Japanese Patent Publication No. 49037/1977). These known polymers have excellent rubber-like elasticity, favorable mechnical characteristics (e.g. strength, elongation and frictional characteristics), water resistance, oil resistance, properties at a low temperature and the like, and hence, they may be used in wide applications such as automobile parts, electrical euqipment. But, they cannot practically be used in injection molding and blow molding because of relatively low melt viscosity.

The present inventors have intensively studied an improved method for obtaining a polyester composition having excellent moldability. As a result, it has been found that a carboxylic acid compound is effective, that is, when a polyester type block copolymer produced by reacting a crystalline aromatic polyester and a lactone is melt-admixing with a carboxylic acid compound selected from an ethylene-carboxylic acid copolymer and an alkali metal, alkali earth metal or zinc salt of aliphatic carboxylic acid having 10 or more carbon atoms, there can be obtained a polyester elastomer having improved properties such as excellent moldability, mechanical characteristics and transparency.

An object of the present invention is to provide an improved polyester type block copolymer composition having a rubber-like elasticity, particularly improved in moldability and mechanical characteristics. Another object of the invention is to provide an improvement of properties of polyester type block copolymer composition by incorporating a carboxylic acid compound selected from an ethylenecarboxylic acid copolymer and an aliphatic carboxylic acid metal salt. These and other objects and advantages of the invention will be apparent to those skilled in the art from the following description.

The desired improved polyester type block copolymer composition of the present invention comprises a polyester type block copolymer produced by reacting a crystalline aromatic polyester and a lactone in melt-admixture with a carboxylic acid compound.

The crystalline aromatic polyester used in the present invention is a polymer being predominantly formed by ester linkages or a combination of ester linkage and ether linkages which has a main repeating unit of at least one aromatic group and has a terminal hydroxy group. The crystalline aromatic polyester has preferably a melting point of 150° C. or higher in case of a high degree of polymerization. For the purpose of utilizing the final composition as a molding material, the crystalline aromatic polyester has preferably a molecular weight of not less than 5,000, more preferably not less than 8,000.

Suitable examples of the crystalline aromatic polyester are homopolyesters such as polyethylene terephthalate, polytetramethylene terephthalate, poly-1,4-cyclohexylenedimethylene terephthalate, polyethylene 2,6-nphthalate; polyester ethers such as polyethylene hydroxybenzoate, poly-p-phenylene bishydroxyethoxyterephthalate; copolyesters or copolyester ethers which comprise mainly tetramethylene terephthalate unit or ethylene terephthalate unit and other copolymer components such as tetramethylene or ethylene isophthalate unit, tetramethylene or ethylene adipate unit, tetramethylene or ethylene sebacate unit, 1,4-cyclohexylenedimethylene terephthalate unit, or tetramethylene or ethylene p-hydroxybenzoate unit, or the like. In case of copolymers they contain preferably 60 molar % or ore of the tetramethylene terephthalate unit or ethylene terephthalate unit.

The lactone is most preferably $\epsilon$-caprolactone, but other lactones such as enantholactone or caprilolactone may also be used. Two or more lactones may be used together.

The above crystalline aromatic copolyester and lactone can be copolymerized in an appropriate ratio, which depends on the kinds of utilities of the final composition. Generally, when the amount of the aromatic polyester is larger, the polymer becomes harder and shows more improved mechanical characteristics such as strength, and on the other hand, when the amount of the lactone is larger, the polymer becomes softer and shows more improved properties at a low temperature. Accordingly, it is preferably to use the aromatic polyester/lactone in the ratio of 97/3 to 5/95 by weight, more preferably 95/5 to 30/70 by weight. For example, in order to obtain a hard molded product, the above ratio is preferably in the range of 95/5 to 70/30 by weight. On the other hand, in order to use as a soft molded product, adhesive, coating material, sealing material and the like, the above ratio is preferably in the range of 75/25 to 30/70 by weight.

The reaction of the crystalline polyester and the lactone for producing the desired polyester type block copolymer may be carried out in the presence or absence of a catalyst. But the use of a catalyst shows a remarkable acceleration of the reaction.

The catalyst used in the polymerization of the lactones can be used generally in the present reaction.

Suitable examples of the catalyst are metals such as lithium, sodium potassium, rubidium, cesium, magnesium, calcium, barium, strontiun, zinc, aluminum, titanium, cobalt, germanium, tin, lead, antimony, arsenic, cerium, boron, cadmium, manganese, and oxide, organometallic compound, organic acid salt, alkoxide thereof. Particular suitable examples of the catalyst are organic titanium, organic aluminum and organic titanium compounds such as diacyl stannous compound, tetraacyl stannic compound, dibutyl tin oxide, dibutyl tin dilaurate, tin dioctanoate, tin tetraacetate triisobutyl aluminum, tetrabutyl titanium, germanium dioxide, antimony trioxide and the like, or the mixture thereof. The catalyst may be added in one portion on the polymerization of a crystalline aromatic polyester. Besides, some of the catalyst may be added on the polymerization of the crystalline aromatic polyester, and the others may be added on the polymerization of a polyester and a lactone. The catalyst may be also added in one portion of the polymerization of a crystalline aromatic polyester and a lactone.

It is preferably to use the catalyst in an amount of 0 to 0.2%, more preferably 0.001 to 0.1% by the total weight of a crystalline aromatic polyester and a lactone.

When the reaction is carried out in the absence of a solvent, a crystalline aromatic polyester and a lactone are melted and mixed together above at the temperature where the mixture thereof can be melted uniformly. On the other hand, in the presence of a solvent, the reaction is preferably carried out at the temperature in the range of about 180° to about 260° C. At the temperature of less than 180° C., it is difficult for a crystalline aromatic polyester and a lactone to be melted and mixed together uniformly. While, at the temperature of above 260° C., undesirable side-reactions such as decomposition and so forth are carried out. Suitable examples of the solvent which are usually employed in the reaction are α-methylnaphtalene and the like.

The ethylene-carboxylic acid copolymer used in the invention is preferably a random or block copolymer containing about 25 to 98.5% by weight of ethylene unit and about 1.5 to 30% by weight of carboxylic acid unit. The copolymer may also contain a small amount of an alkylene unit such as propylene unit and butylene unit. There may be used as the ethylene-carboxylic acid copolymer a graft copolymer which is produced by copolymerizing ethylene and a small amount of other α-olefine (e.g. propylene) or a diene compound (e.g. hexadiene) and graft-copolymerizing the copolymer with a carboxylic acid monomer. Suitable examples of the ethylene-carboxylic acid copolymer are copolymers of ethylene with acrylic acid, methacrylic acid, maleic acid, fumaric acid, monoethyl maleate, monomethyl maleate, etc.

The acid groups contained in the above ethylenecarboxylic acid copolymer may be neutralized with a metallic ion. Suitable examples of the metallic ion are an alkali metal ion, an alkaline earth metal ion, zinc ion, or the like.

The ethylene-carboxylic acid copolymer is usually incorporated into the composition in an amount of 1 to 40% by weight, preferably 3 to 20% by weight, based on the weight of the polyester type block copolymer. When the amount is less than 1% by weight, it is less effective on enhancing crystallizability of the polyester type block copolymer due to less dispersibility thereof, and on the other hand, when the amount is over 40% by weight, it induces undesirable phase separation of the composition, which results in lowering of strength of the product.

Besides, a polycarbodiimide may also incorporated into the composition in order to raise the melting temperature of the composition. The polycarbodiimide includes a compound of the formula:

$$X_1-R_1'-[N=C=N-R_2']_n-N=C=N-R_3'-X_2$$

wherein $R_1'$, $R_2'$ and $R_3'$ are each a divalent aliphatic hydrocarbon group having 1 to 12 carbon atoms, a divalent alicyclic hydrocarbon group having 6 to 15 carbon atoms or a divalent aromatic hydrocarbon group having 6 to 15 carbon atoms, $X_1$ and $X_2$ are each a group of the formula:

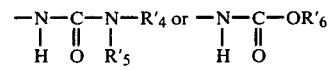

(wherein $R_4'$, $R_5'$ and $R_6'$ are each an aliphatic hydrocarbon group having 1 to 12 carbon atoms, an alicylic hydrocarbon group having 5 to 15 carbon atoms or an aromatic hydrocarbon group having 6 to 15 carbon atoms, and $R_4'$ and $R_5'$ may also be hydrogen atom), and n is 0 to 30. The polycarbodiimide may be used in an amount of about 0.2 to 30% by weight, preferably about 2 to 8% by weight, based on the weight of the polyester type block copolymer.

The aliphatic carboxylic acid metal salt used in the present invention includes an alkali metal, alkali earth metal or zinc salts of an aliphatic monocarboxylic acid or di- or more valent polycarboxylic acid having 10 or more carbon atoms, such as octadecylsuccinic acid, octadecenylsuccinic acid, docosanedicarboxylic acid, dimer acid, trimer acid or a mixture thereof with an alkali metal. The dimer acid means a dicarboxylic acid having 36 carbon atoms which is prepared by dimerizing an unsaturated aliphatic acid having 18 carbon atoms, and the trimer acid means a tricarboxylic acid which is prepared by trimerizing an unsaturated aliphatic acid having 18 carbon atoms. The aliphatic polycarboxylic acid has preferably a carbon atom of 10 or more, more preferably 17 to 54, and a molecular weight of not more than about 1,500, more preferably about 450 to 1,000 and has preferably a carboxyl group of two or more, more preferably 2 to 4, per one molecule. Besides, aliphatic polycarboxylic acid having substantially no unsaturated bond is preferable because of less coloring. The dimer acid and trimer acid are preferably converted into saturated aliphatic acids by hydrogenation thereof.

Suitable examples of the alkali metal are, for example, lithium, sodium, potassium, and suitable examples of the alkali earth metal are magnesium, calcium, strontium, barium or the like, which are used alone or in mixture thereof. The aliphatic carboxylic acid is neutralized with these metals. The aliphatic carboxylic acid is preferably neutralized in 90% or more of the carboxyl groups. The metal salts of aliphatic carboxylic acids may be used in a mixture of two or more thereof.

The metal salts of aliphatic carboxylic acid are used in an amount of about 0.1 to 15% by weight, preferably 0.5 to 10% by weight, based on the weight of the polyester type block copolymer. When the amount of the aliphatic carboxylic acid metal salt is less than about 0.1% by weight, it is less effective on improvement or moldability, and on the other hand, when the amount is over about 15% by weight, it gives undesirable effect on the mechanical characteristics of the product.

The composition of the present invention can be obtained by incorporating with the above components, and by melting and mixing in a screw type extruder or a Banbury mixer and the like.

The polyester type block copolymer composition of the present invention may also be incorporated with antioxidant, filler, pigment and the like, when it is desired.

According to the present invention, the properties of the composition are improved. By incorporating a carboxylic compound selected from an ethylene-carboxylic acid copolymer and an aliphatic carboxylic acid metal salt, which have good compatibility with the polyester type block copolymer substantially having ester bonds of the carboxylic acid, there can be obtained a polyester elastomer having greatly improved moldability, mechanical characteristics, heat resistance and transparency. The composition comprising a polyester type block copolymer and a carboxylic acid compound shows rapid crystallizability, shorter cooling time at injection molding and miner trime, and remarkably improved melt viscosity, and hence, can be molded not only injection molding but also by blow molding. This composition shows excellent heat aging resistance, impact properties, transparency and frictional characteristics without deteriorating the original properties of the block copolymer, and hence, can be used for various utilities, such as injection moldings, blow moldings and extrusion moldings useful as parts of various machines (e.g. name plates, automobile parts, switches, holders, hooks, packings, etc), coatings (e.g. wire coatings), and the like.

The present invention is illustrated by the following Examples but should not be construed to be limited thereto. In Examples, the various properties were measured in the following methods.

(1) Reduced specific viscosity

It was measured under the following conditions:
Solvent: Phenol/tetrachloroethane (6/4 by weight).
Concentration: 100 mg/25 ml.
Temperature: 30° C.

(2) Melting point, crystallization temperature

A test piece was put in a differential scanning calorimeter (Perkin Elemer corporation). The melting point was determined at the temperature with an endothermic peak during heating at a rate of 20° C./minute. While, the crystallization temperature was determined by an exothermic peak during dropping from at a temperature of 20° C. higher than the melting point at a rate of −20° C./minute.

(3) Melt index

It was measured by the method as defined in Japanese Industrial Standards (JIS) K 6760 at 230° C.

(4) Tensile strength, tensile elongation and tensile modulus

The starting chips were pressed with heat-pressing to form a plane plate (thickness: 2 mm), which was punched to obtain a Dumbbell-shaped test piece. The test piece was drawn at a rate of 500 mm/minute, and the weight (kg) of load was measured at break of the test piece. The tensile strength (kg/cm$^2$) was shown by a value obtained by dividing the load (kg) at break by the initial sectional area (cm$^2$) of the test piece. The tensile elongation (%) was shown by a ratio of elongation of test piece at break to the length of the starting test piece. The tensile modulus was obtained from the stress-tensile elongation curve.

(5) Wearing properties

A test piece was rubbed with a wheel of a tapered wear tester OS-17 under a load of one kg for 1,000 cycles, and then, the reduced weight (mg) of the test piece was measured.

Preparation 1

Polytetramethylene terephthalate (70 kg) and ε-caprolactone (30 kg) were charged into a reactor. After purging the reactor with nitrogen gas, the mixture was melt-reacted with stirring at 230° C. for 2 hours. The unreacted ε-caprolactone was removed in vacuum. The polyester elastomer thus obtained had a reduced specific viscosity of 1.163, and further had a tensile strength at break of 371 kg/cm$^2$ and tensile elongation at break of 708%.

EXAMPLE 1

The polyester type block copolymer chips (I) (80 parts by weight) obtained in the preparation 1 and ionic copolymer A, which was obtained copolymerization of ethylene (80 parts by weight) and methacrylic acid (20 parts by weight), and of which carboxylic moiety was neutralized by sodium ion (melt index: 5 g/10 minutes, softening point: 63° C.), were charged into a drum tumbler. Then, the mixture was stirred at room temperature for 30 minutes. The resulting mixture was extruded with a biaxial extruder (40 mmφ) at a temperature of 230° C. After cooling with water, the extruded product was cut to give chips. The resulting chips had a tensile strength at break of 301 Kg/cm$^2$ and a tensile elongation at break of 530%.

EXAMPLE 2

The polyester type block copolymer chips (I) (80 parts by weight) obtained in the preparation 1 and ionic copolymer B, which was obtained copolymerization of ethylene (80 parts by weight) and methacrylic acid (20 parts by weight), and of which carboxylic moiety was neutralized by zinc ion (melt index: 0.7 g/10 minutes, softening point: 66° C.), were charged into a drum tumbler. Then the mixture was stirred at room temperature for 30 minutes. The resulting mixture was treated in the same manner as described in Example 1, with a biaxial extruder. The tensile strength at break, tensile elongation at break, tensile modulus and impact resistance of the resulting chips were measured. The results are shown in Table 1.

TABLE 1

| No. | Block co-polymer (%) | Ionic co-polymer (%) | Tensile strength at break (Kg/cm$^2$) | Tensile elongation at break (%) | Tensile modulus Kg/cm$^2$ | Impact resistance |
|---|---|---|---|---|---|---|
| 1 | 100 | — | 371 | 708 | 2720 | NB |
| 2 | 80 | A 20 | 301 | 530 | 2520 | NB |
| 3 | 90 | B 10 | 301 | 600 | 2740 | NB |
| 4 | 80 | 20 | 243 | 513 | 2770 | NB |
| 5 | 70 | 30 | 197 | 453 | 2790 | NB |

The crystallization temperature, specific gravity and melt index of the resulting chips were measured. The results are shown in Table 2.

TABLE 2

| No. | DSC Melting point (°C.) | DSC Crystallization temp. (°C.) | Specific gravity | Melt index (230 °C.) | Color of product |
|---|---|---|---|---|---|
| 1 | 210.0 | 165.0 | 1.253 | 52.0 | good |
| 2 | 211.0 | 182.0 | 1.215 | 10 | good |
| 3 | 214.5 | 169.0 | 1.212 | 8 | good |
| 4 | 211.5 | 169.0 | 1.178 | 2.0 | good |
| 5 | 210.5 | 170.5 | 1.151 | 1.0 | good |

As is clear from the above Table 1 and 2, the compositions of the present invention showed rising of crystallization temperature, decrese of melt index and improved moldability.

REFERENCE EXAMPLE 1

The polyester polyether block copolymer having a polytetramethylene glycol of 30% by weight (80 parts by weight), which was obtained by reacting terephthalic acid with 1,4-butanediol and polytetramethylene glycol having molecular weight of 1000, was incorporated with an ionic copolymer A (20 parts by weight) in the same manner as described in Example 1. Also, the above block copolymer was not incorporated with an ionic copolymer A. The crystallization temperature, specific gravity and melt index of the resulting chips were measured respectively. The results are shown in Table 3.

TABLE 3

| Ionic copolymer A (%) | DSC Melting point (°C.) | DSC Crystallization Temp. (°C.) | Specific gravity | Melt index (230° C.) | Color of product (250° C.) |
|---|---|---|---|---|---|
| 20 | 213.0 | 178.0 | 1.201 | 10.0 | bad (brown) |
| 0 | 215.0 | 163.0 | 1.235 | 20.0 | good |

EXAMPLE 3

The polyester type block copolymer obtained in Example 1 (1000 g), Irganox 1010 ® (phenolic antioxidant; manufactured by Ciba-Geigy, 3 g) and the desired amount of a carboxylic acid salt in Table 4 were charged into a drum tumbler. The mixture was stirred at room temperature for 30 minutes. The resulting mixture was extruded with a biaxial extruder at a temperature of 230° C. After cooling with water, the extruded product was cut to give chips. The resulting chips were dried under reduced pressure at a temperature of 100° C. The melting point, crystallization temperature and melt index of the chips were measured. The results are shown in Table 4.

TABLE 4

| No. | Carboxylic acid salt Kind | Amount (weight %) | DSC Melting point (°C.) | DSC Crystalization temp. (°C.) | Melt index (g/10 minutes) |
|---|---|---|---|---|---|
| 1 | Disodium dimerate | 0.3 | 211.5 | 174.5 | 52.0 |
| 2 | " | 0.6 | 213 | 175.5 | 28.5 |
| 3 | " | 3.0 | 213 | 176 | 8.3 |
| 4 | " | 5.0 | 212.5 | 176.0 | 7.0 |
| 5 | " | 15.0 | 212 | 176.5 | 6.8 |
| 6 | Sodium stearate | 3.0 | 211.5 | 174 | 33.7 |
| 7 | Calcium stearate | 3.0 | 208.3 | 169 | 48 |
| 8 | Sodium sebacate | 3.0 | 210.5 | 179 | 37.5 |
| 9 | — | 0 | 210 | 165 | 52 |

Besides, the chips obtained were formed into a sheet (thickness: 2 mm) with hot-pressing, of which the tensile strength at break, tensile elongation at break and transparency were measured. The results are shown in Table 5.

The chips were formed into test pieces with injection molding machine, of which the wearing properties were also measured. The results are shown in Table 5.

The test pieces were stood at a temperature of 250° C. for 20 minutes. The change of color of the test pieces are shown in Table 5.

TABLE 5

| No. | Tensile strength at break (Kg/cm$^2$) | Tensile elongation at break (%) | Transparency | Tapered wearing (mg/1000 cycle) | Color of product (250° C. × 20 minutes) |
|---|---|---|---|---|---|
| 1 | 370 | 705 | good | 18 | good |
| 2 | 375 | 703 | " | 17 | " |
| 3 | 388 | 633 | " | 14 | " |
| 4 | 390 | 625 | " | 14 | " |
| 5 | 284 | 563 | " | 12 | " |
| 6 | 367 | 706 | " | 19 | " |
| 7 | 365 | 685 | bad | 18 | " |
| 8 | 374 | 703 | good | 19 | " |
| 9 | 371 | 706 | " | 20 | " |

As is clear from the bove Table 4 and 5, the compositions of the present invention showed rapid crystallizability and remarkable improved melt viscosity, and additionally showed excellent transparency, frictional characteristics and heat resistance without deteriorating the original properties of the block copolymer polyester.

What is claimed is:

1. A polyester block copolymer composition which comprises a polyester block copolymer obtained by reacting a polytetramethylene terephthalate and a monomeric lactone in the ratio of 97/3 to 5/95 by weight in melt-admixture with an ethylene-carboxylic acid copolymer in an amount of 10 to 30% by weight based on the weight of the polyester block copolymer composition, the acid groups in the ethylene-carboxylic acid copolymer being neutralized with metallic ion selected from the group consisting of alkali metal ions, alkaline earth metal ions and zinc ions.

2. A composition according to claim 1, wherein the ethylene-carboxylic acid copolymer is a random or block copolymer containing about 25 to 98.5% by weight of ethylene unit and about 1.5 to 30% by weight of carboxylic acid unit.

3. The composition of claim 1 wherein the weight ratio of polytetramethylene terephthalate and monomeric lactone ranges from 95/5 to 30/70.

4. The composition of claim 3 wherein said monomeric lactone is ε-caprolactone.

* * * * *

UNITED STATES PATENT AND TRADEMARK OFFICE
CERTIFICATE OF CORRECTION

PATENT NO. : 4,670,510

DATED : June 2, 1987

INVENTOR(S) : Takuma Kobayashi et al

It is certified that error appears in the above-identified patent and that said Letters Patent is hereby corrected as shown below:

On the Title page the "Foreign Application Priority Data" should be:

Foreign Application Priority Data
Feb. 18, 1983 [JP] Japan . . . . . 58-26674
Feb. 22, 1983 [JP] Japan . . . . . 58-29064

Signed and Sealed this

Fifteenth Day of September, 1987

*Attest:*

DONALD J. QUIGG

*Attesting Officer*  *Commissioner of Patents and Trademarks*